O. ZOBLER.
OIL SETTLING TANK.
APPLICATION FILED SEPT. 12, 1908.
909,733.
Patented Jan. 12, 1909.
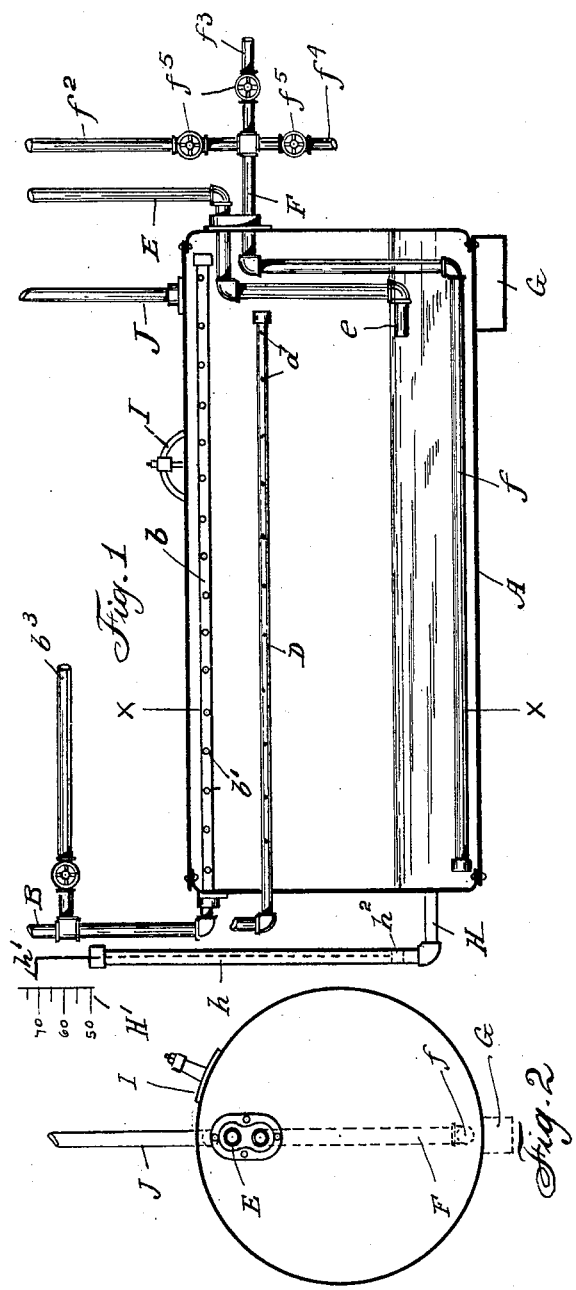
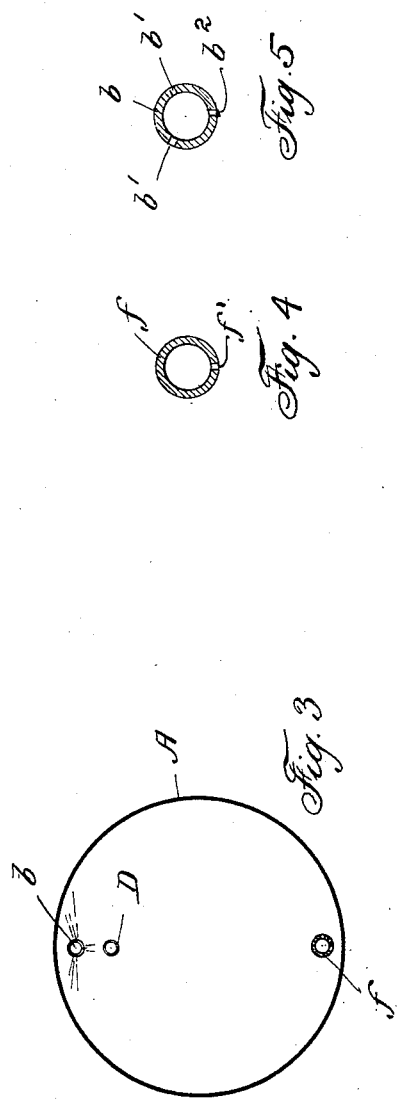
WITNESSES
M. R. Reuss
Chas. Gunther
INVENTOR
Otto Zobler
By Robt. Klotz
Atty.

UNITED STATES PATENT OFFICE.

OTTO ZOBLER, OF CHICAGO, ILLINOIS.

OIL-SETTLING TANK.

No. 909,733.        Specification of Letters Patent.        Patented Jan. 12, 1909.

Application filed September 12, 1908. Serial No. 452,791.

*To all whom it may concern:*

Be it known that I, OTTO ZOBLER, a citizen of the United States, and residing at Chicago, in the county of Cook and State of Illinois, have invented a new and useful Improvement in Oil-Settling Tanks, of which the following is a complete specification.

This invention relates to improvements in oil settling tanks and more particularly to a settling tank adapted for use in dyeing and cleaning establishments.

In dyeing and cleaning establishments where gasolene, naphtha or a like liquid is used in large quantities for cleaning purposes, the liquid is ordinarily returned from the washers to a settling tank where it is allowed to settle, either to be returned to the washers direct from the settling tank or first to a still to further separate the dirt if necessary. The liquid is usually allowed to stand until the dirt has settled to the bottom of the receptacle of its own volition, but such method requires the liquid to remain idle for a considerable period before it will become clean enough to be returned to the washers. Furthermore the walls and bottoms of the settling tanks as usually equipped soon become covered with a layer of dirt which is continually falling down or becoming loosened so as to permit it to be returned to the washers with the liquid.

The object of this invention is to provide a settling tank for cleaning liquids so constructed that the dirt may be quickly separated from the liquid and the liquid returned direct to the washers or passed on to a still for further cleaning.

It is also an object of the invention to provide means for preventing the formation of a coating of dirt on the walls and bottom of the receptacle and to effectively remove the dirt from the receptacle after it has settled in the liquid.

The invention consists of the matters hereinafter described in the specification and more fully pointed out and defined in the appended claims.

In the drawings: Figure 1 is a longitudinal section of a settling tank embodying my invention. Fig. 2 is an end elevation of the same. Fig. 3 is a section taken on line $x$—$x$ of Fig. 1. Fig. 4 is a transverse section of the cleaning pipe. Fig. 5 is a transverse section of the inlet pipe.

As shown in said drawings: A indicates a tank or receptacle of any desired material and construction, but preferably of sheet metal and cylindrical in shape, and which may be of any preferred size. An inlet pipe B opens into said receptacle near the top thereof and preferably through one end, and is provided with a nozzle $b$ which extends longitudinally of the receptacle near the top thereof. Said nozzle may be of any preferred construction but, as shown, it comprises a piece of pipe having a plurality of apertures $b'$ in the sides thereof which open upwards therefrom at angles of approximately 45 degrees, so that the liquid when entering the receptacle is sprayed onto the side walls thereof and acts to wash down any sediment that may have been deposited on said walls. In the bottom of said nozzle is a single drip aperture $b^2$, as shown more clearly in Fig. 5, which is adapted to permit all of the liquid to drain from the nozzle. The receptacle may be filled through the pipe B, either with new liquid or with the dirty liquid which is returned therethrough from the washers through connections not shown. Or it may be filled from the still, not shown, through the pipe $b^3$ which opens into the pipe B.

For the purpose of quickly settling the dirty liquid after it has been returned from the washers, an agitating pipe D leads from any suitable source of steam supply and extends horizontally into the receptacle at a point sufficiently below the top thereof to permit its being covered by the liquid when the receptacle is filled. The inner end of said pipe is provided with perforations $d$ through which the steam is permitted to escape into the liquid for a sufficient time to thoroughly agitate the same and mix with it. When the steam is shut off it condenses and rapidly settles and carries the dirt to the bottom of the receptacle.

The supply pipe E, leading to the washers, not shown, extends into the receptacle and the intake end $e$ thereof opens sufficiently above the bottom of the receptacle to prevent the dirt from entering it. After the clear liquid has been drawn off the residue in the receptacle contains the dirt and sediment brought back with the liquid from the washers, and for the purpose of removing said residue from the receptacle a cleaning pipe F extends into the receptacle and the intake end $f$ thereof extends along the bottom of the receptacle and is provided with a longitudinal slot $f'$ in its under side. Connected with the outer end of said cleaning pipe is a waste pipe $f^2$, a steam pipe $f^3$ and a pipe $f^4$ leading to the still. Each of said pipes $f^2$, $f^3$ and $f^4$ is provided with a valve $f^5$ by means of which it may be cut out of service. If there is any appreciable quantity of water in the bottom of the receptacle or if the remaining washing liquid is too dirty to be of further use the valve in the waste pipe $f^2$ may be opened and the water or washing liquid drawn off. When it is desired to return the dirty washing liquid to the still the valve in the pipe $f^4$ is opened and the liquid is drawn or pumped to the still. In either case, however, when the residue in the receptacle is to be withdrawn, the valve in the steam pipe $f^3$ may be opened and steam admitted to the receptacle. Owing to the slot $f'$ in the pipe end $f$ the steam is permitted to escape onto the bottom of the receptacle and by agitating the liquid thoroughly stirs up the dirt and sediment from the bottom. The steam is then shut off and suction applied to either the pipe $f^2$ or $f^4$, as the case may be, and all the dirt is sucked up by the pipe $f$ and removed with the liquid.

If preferred a settling pit G may be constructed beneath the receptacle and into which the heavier particles of dirt and sediment may be deposited. If preferred, also, a pipe H may lead from the bottom of the receptacle and extend upwardly to any desired height to near an indicating scale H' of any desired construction. Within said pipe is a rod $h$ having an indicator or pointer $h'$ on the upper end thereof adapted to travel along the scale and indicate the depth of the liquid in the receptacle. On the bottom of said rod is a piston $h^2$ against which the liquid acts to raise or lower the indicator. In the top of the receptacle is a manhead I by means of which access may be had to the interior of the receptacle, and a vent pipe J opens from the top of the receptacle and provides means for the escape of air or gas.

I claim as my invention:

1. In a device of the class described the combination with a receptacle of an inlet pipe therefor, means on said pipe adapted to spray the walls of the receptacle, and a slotted pipe adapted to wash the bottom of the receptacle.

2. In a device of the class described the combination with a receptacle of an inlet pipe therefor, means on said pipe adapted to spray the walls of the receptacle, a slotted pipe extending along the bottom of the receptacle, means adapted to admit steam into said slotted pipe and clean the bottom of the receptacle, and means adapted to draw off the contents of the receptacle through said pipe.

3. In a device of the class described the combination with a receptacle of an inlet pipe therefor, a nozzle on the inner end of said pipe adapted to spray the walls of the receptacle, means adapted to agitate the contents of the receptacle and settle the dirt therein, a pipe adapted to draw off the clear contents of the receptacle, and a longitudinally slotted pipe adapted to remove the settlings.

4. In a device of the class described the combination with a receptacle of an inlet pipe therefor adapted to spray liquid on to the receptacle walls, a perforated steam pipe adapted to agitate the contents of the receptacle, an apertured pipe in the receptacle adjacent the bottom thereof, means for admitting steam through said pipe to clean the bottom of the receptacle, a suction pipe connected with said apertured pipe and adapted to draw off the dirty liquid from the bottom of the receptacle, and a pipe adapted to withdraw the clean liquid from the upper portion of the receptacle.

5. In a device of the class described the combination with a receptacle adapted to contain a liquid, of a settling pit beneath said receptacle, means adapted to spray steam into said liquid to settle the dirt therein, means in the lower portion of the receptacle adapted to direct steam into the liquid and wash the dirt from the bottom of the receptacle, and a pipe adapted to draw the clear liquid from the upper portion of the receptacle.

In witness whereof I have hereunto subscribed my name in the presence of two witnesses.

OTTO ZOBLER.

Witnesses:
CHAS. GUNTHER,
ROBT. KLOTZ.